United States Patent [19]

Kawada et al.

[11] 4,284,932
[45] Aug. 18, 1981

[54] SYSTEM FOR DRIVING DC MOTOR

[75] Inventors: Shigeki Kawada; Yoshiki Fujioka; Naoto Ohta, all of Hino, Japan

[73] Assignee: Fujitsu Fanuc Limited, Hino, Japan

[21] Appl. No.: 76,615

[22] Filed: Sep. 18, 1979

[30] Foreign Application Priority Data

Oct. 2, 1978 [JP] Japan ................... 53/120374

[51] Int. Cl.³ .................................... H02P 5/16
[52] U.S. Cl. ........................... 318/338; 318/493; 318/434
[58] Field of Search ............... 318/338, 350, 356, 493, 318/434, 416; 361/33, 30, 23

[56] References Cited

U.S. PATENT DOCUMENTS

| | | | |
|---|---|---|---|
| 3,536,957 | 10/1970 | Iverson et al. | 361/33 |
| 3,584,706 | 6/1971 | Hall et al. | 187/29 R |
| 3,950,684 | 4/1976 | Peterson | 318/338 |
| 3,961,688 | 6/1976 | Maynard | 187/29 R |
| 3,978,381 | 8/1976 | Yamamoto et al. | 361/33 |
| 4,118,749 | 10/1978 | Matuzaki et al. | 361/33 |

Primary Examiner—David Smith, Jr.
Attorney, Agent, or Firm—Armstrong, Nikaido, Marmelstein & Kubovcik

[57] ABSTRACT

A system for a DC motor associated with a field winding and driven by using a three-phase anti-parallel thyristor bridge circuit, comprising a first means for controlling an armature current $I_a$ flowing through an armature of the DC motor, and; a second means for controlling a field current $I_f$ flowing the field winding by obtaining the feedback values of a voltage $E_a$ of the armature and the field current $I_f$ and by changing the maximum level of the current $I_f$ in accordance with a three-phase alternating voltage $V_{ac}$ applied to the three-phase anti-parallel thyristor bridge circuit. In the system, when the three-phase alternating voltage $V_{ac}$ decreases to a value lower than a predetermined value $V_o$, the field current $I_f$ are decreased so that the armature voltage $E_a$ is decreased.

4 Claims, 3 Drawing Figures

SYSTEM FOR DRIVING DC MOTOR

FIELD OF THE INVENTION

This invention relates generally to a system for driving a DC (Direct Current) motor and, more particularly, to a system for driving a DC motor associated with a field winding and driven by using a three-phase anti-parallel thyristor bridge circuit formed by thyristors.

BACKGROUND OF THE INVENTION

In recent years, DC motors associated with a field winding have been driven by using a three-phase anti-parallel thyristor bridge circuit, which has an advantage that the return of energy from the DC motor to the main circuit and the reverse rotation of the DC motor can be effected without change-over contacts. The three-phase anti-parallel bridge circuit comprises a first bridge circuit formed by six thyristors for supplying forward current to the DC motor and a second bridge circuit formed by six thyristors for supplying backward current to the DC motor. The first and second bridge circuits are connected in parallel to each other with the conducting directions of the thyristors between the two circuits opposite each other. The conducting state of the first bridge circuit is called a "converter operating state", while the conducting state of the second bridge circuit is called an "inverter operating state". When the speed of the DC motor is decreased, the three-phase anti-parallel bridge circuit is changed from the converter operating state into the inverter operating state, and, after that, the anti-parallel bridge circuit is again changed into the converter operating state. During those changes of the state of the anti-parallel bridge circuit, the commutation between the thyristors of the first bridge circuit and those of the second bridge circuit may fail, if pulses for firing the thyristors are not generated or if a three-phase alternating voltage applied to the thyristors is decreased. As a result, an excess of current flows through the DC motor so that the DC motor may be damaged. Therefore, it is important to avoid the failure of the commutation of the thyristors between two bridge circuits connected anti-parallel to each other. The present invention relates to avoiding the failure of commutation in the case of an applied voltage drop.

PRIOR ART OF THE INVENTION

The system for driving a DC motor associated with a field winding and driven by using a three-phase anti-parallel bridge circuit of the prior art comprises a first means for controlling a current $I_a$ flowing through the armature of the DC motor, and; a second means for controlling a current $I_f$ flowing through the field winding. The second controlling means controls the current $I_f$ by obtaining the feedback values of a voltage $E_a$ of the armature of the DC motor and the current $I_f$, and by maintaining the maximum level of the current $I_f$ at one level. This allows the voltage $E_a$ to be controlled so that it is decreased when the current $I_f$ reaches a predetermined current $I_o$, which is defined as an "armature control range", (or a "constant-torque range") and remains at one level when the current $I_f$ is less than current $I_o$, which is defined as a "field control range" or a "constant-power range". As a result, the efficiency of the DC motor is relatively high and a rise in the temperature of the DC motor can be prevented.

However, in the above-mentioned system of the prior art, when the input three-phase alternating voltage applied to the anti-parallel bridge circuit is decreased in a case where the speed of the DC motor is decreased, the commutation between two bridge circuits connected anti-parallel to each other may fail, and the DC motor may be damaged. This is because the voltage $E_a$ of the armature is not decreased, even when the input voltage applied to the anti-parallel bridge circuit is decreased.

OBJECT AND SUMMARY OF THE INVENTION

It is a principal object of the present invention to provide a system for driving a DC motor associated with a field winding and driven by using a three-phase anti-parallel bridge circuit formed by thyristors, wherein the commutating between the thyristors will not fail even when the three-phase alternating voltage applied to the anti-parallel bridge circuit is decreased in a case where the speed of the DC motor is decreased.

According to the prevent invention, there is provided a system for driving a DC motor associated with a field winding and driven by using a three-phase anti-parallel thyristor bridge circuit comprising a first means for controlling a current $I_a$ flowing through an armature of the DC motor and a second means for controlling a current $I_f$ flowing through the field winding by obtaining the feedback values of a voltage $E_a$ of the armature and the current $I_f$ and by changing the level of the current $I_f$ in accordance with a three-phase alternating voltage $V_{ac}$ applied to the three-phase anti-parallel bridge circuit. In the system, when the voltage $V_{ac}$ is decreased lower than a predetermined value $V_o$, the current $I_f$ is decreased. As a result, the voltage $E_a$ is also decreased.

The present invention will be more clearly understood from the following description with reference to the accompanying drawings.

PREFERRED EMBODIMENT OF THE INVENTION

Figure 1:
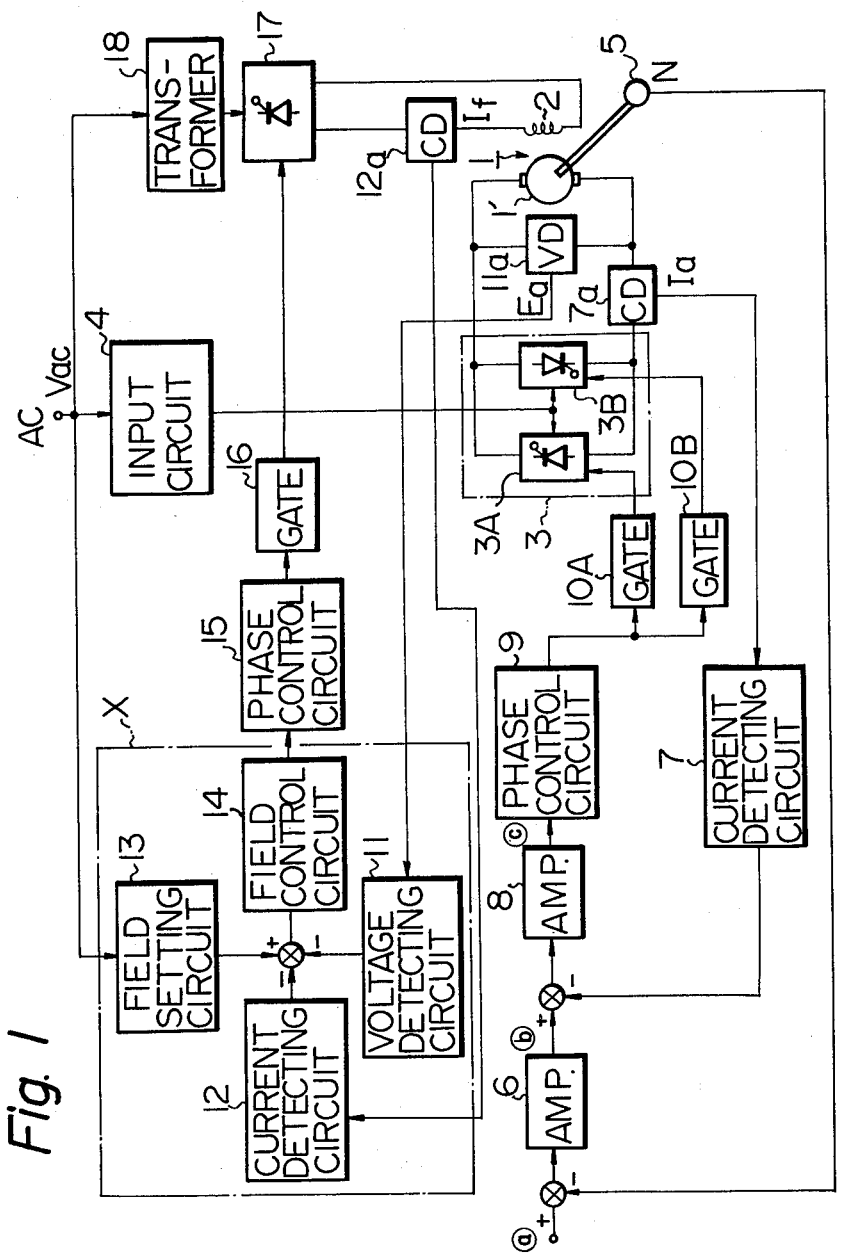
FIG. 1 is a block diagram illustrating an embodiment of the system for driving a DC motor of the present invention.

Referring to FIG. 1, a DC motor 1 associated with a field winding 2 is driven by using a three-phase anti-parallel bridge circuit 3 formed by two bridge circuits 3A and 3B, for supplying a forward current and a backward current, respectively, to an armature 1' of the DC motor 1. Each of the bridge circuits 3A and 3B, which are connected anti-parallel to each other, is composed of six thyristors. A three-phase alternating voltage $V_{ac}$ is supplied to the bridge circuits 3A and 3B through an input circuit 4. The speed of the DC motor 1 is controlled by two control loops, one of which controls a current $I_a$ flowing through the armature 1' of the DC motor 1, while the other controls a current $I_f$ flowing through the field winding 2.

The former of the above-mentioned two control loops will now be explained. First of all, the difference between the voltage of a velocity indication signal "a"

and that of a velocity feedback signal N generated from a tacho-generator 5 is amplified by an amplifier 6. It should be noted, that the tacho-generator 5 is connected to the armature 1'. Next, the difference between the output voltage of the amplifier 6 and that of a current detecting circuit 7 is amplified by an amplifier 8. Here it should be noted, that the current detecting circuit 7 amplifies the current $I_a$ detected by a current detector 7a, which is arranged between the armature 1' and the three-phase anti-parallel bridge circuit 3. Finally, an output signal "c" of the amplifier 8 is applied to a phase control circuit 9 as a command for enlarging or reducing phase angles. Firing pulses generated from gate circuits 10A and 10B, commonly controlled by the phase control circuit 9, are supplied to the gates of the thyristors of the bridge circuits 3A and 3B.

The second loop of the above-mentioned control loops will now be explained. A voltage $E_a$ detected by a voltage detector 11a is supplied to a voltage detecting circuit 11, which produces a negative signal. The current $I_f$ detected by a current detector 12a is supplied to a current detecting circuit 12, which produces a negative signal. A field setting circuit 13 produces a positive signal whose voltage is dependent upon the voltage $V_{ac}$ to the three-phase anti-parallel bridge circuit. As a result, a field control circuit 14 integrates the sum of the three signals generated from the three circuits 11, 12 and 13, and the circuit 14 produces an analog voltage. The analog voltage is applied to a phase control circuit 15 as a command for enlarging or reducing phase angles. As a result, firing pulses generated from a gate circuit 16 controlled by the phase control circuit 15 are supplied to the gates of the thyristors of a bridge circuit 17. The voltage $V_{ac}$ is supplied to the circuit 17 through a transformer 18. Thus, the current $I_f$ flowing in the field winding 2 is controlled by a field control part X indicated in FIG. 1.

Figure 2:
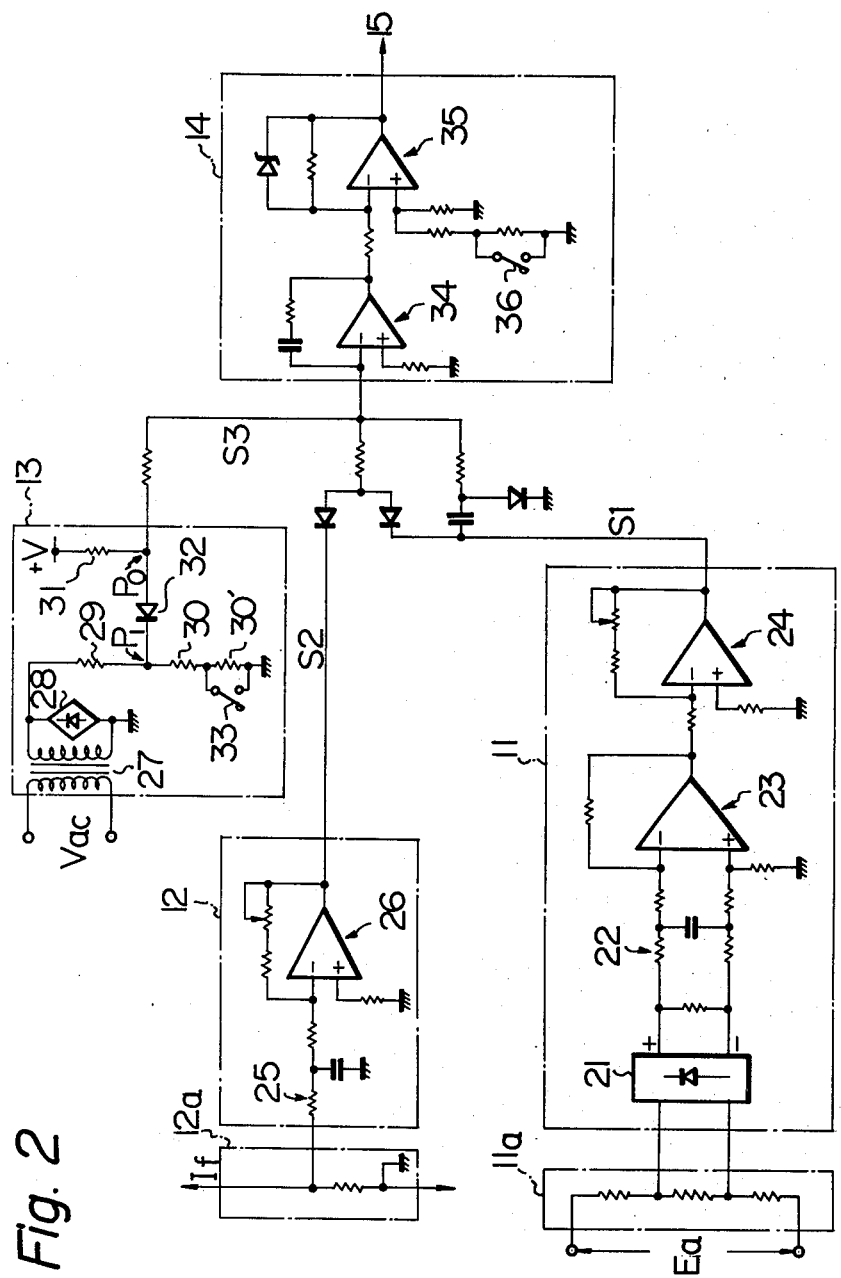
FIG. 2 is a detailed circuit diagram of the field control part X of FIG. 1.

FIG. 2 is a detailed circuit diagram of the field control part X of FIG. 1. In FIG. 2, the voltage detecting circuit 11 includes a rectifier 21 formed by a diode bridge for rectifying the voltage $E_a$, a smoothing circuit 22 formed by resistors and a capacitor for smoothing the output of the rectifier 21, a differential amplifier 23 for amplifying the output of the smoothing circuit 22 and an amplifier 24 for amplifying the output of the differential amplifier 23. The circuit 11 transmits a negative signal S1 to the field control circuit 14. The current detecting circuit 12 includes a smoothing circuit 25 formed by a resistor and a capacitor for smoothing the current $I_f$ and an amplifier 26 for amplifying the output of the smoothing circuit 25. The circuit 12 transmits a negative signal S2 to the field control circuit 14. The field setting circuit 13 includes a transformer 27 to whose primary winding is applied the input voltage $V_{ac}$, a rectifier 28 for rectifying the output of the secondary winding of the transformer 27, resistors 29, 30, 30' and 31 and a diode 32. A switch 33 associated with the resistor 30' is used for switching two commercial frequencies of the input power supply AC, for example, 50 Hz and 60 Hz. The values of resistors 29, 30, 30' and 31 are predetermined so that the diode 32 is not conductive when the voltage $V_{ac}$ is equal to or higher than a predetermined value $V_o$, while the diode 32 conducts when the voltage $V_{ac}$ is lower than the predetermined value $V_o$. When the diode 32 is conductive, a voltage at $P_o$ coincides with a voltage at $P_1$. In other words, when the voltage $V_{ac}$ becomes lower than the predetermined value $V_o$, the voltage of the positive signal S3 generated from the circuit 13 becomes low. The field control circuit 14 includes an integrator 34 for integrating the sum of the three signals S1, S2 and S3, an amplifier 35 for amplifying the output of the integrator 34, and a switch 36 for switching two commercial frequencies, for example, 50 Hz and 60 Hz. The above-mentioned three signals S1, S2 and S3 are balanced in the steady state of the DC motor 1. However, when the voltage $V_{ac}$ is decreased, the voltage of the signal S3 is also decreased, while the voltages of the signals S1 and S2 are increased. In other words, when the voltage $V_{ac}$ becomes lower than the predetermined value $V_o$, the current $I_f$ flowing through the field winding 2 (FIG. 1) is decreased. As a result, the voltage $E_a$ of the armature 1' (FIG. 1) is also decreased, since the voltage $E_a$ is denoted by $E_a =$ (the field magnetic flux $\Phi$)×(the speed N of the DC motor 1)

where $\Phi$ is in proportion to the current $I_f$.

Figure 3A:
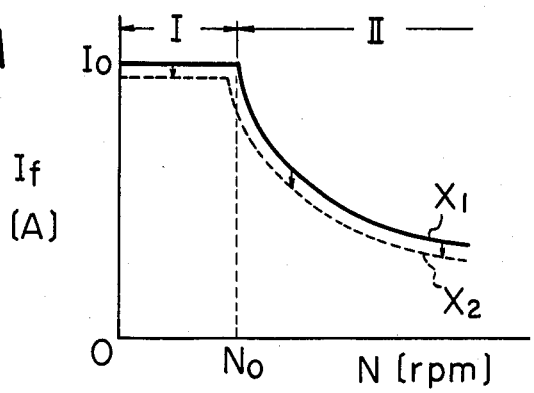
FIGS. 3A through 3E are graphs for explaining the operation of the system of FIG. 1.
Figure 3B:
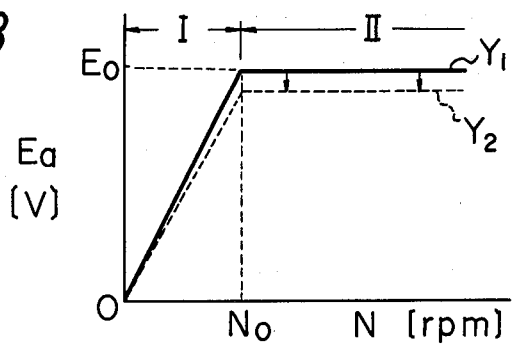
Figure 3C:
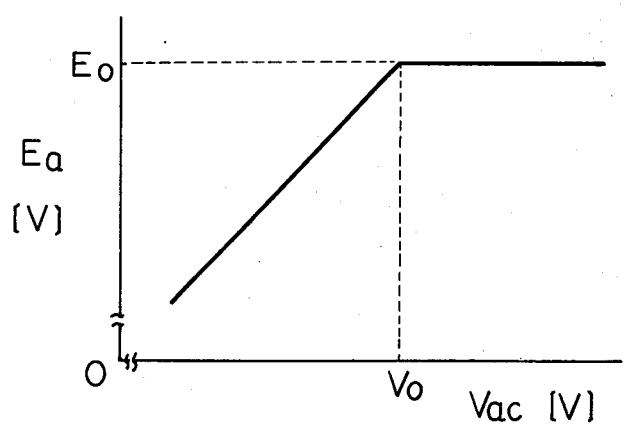
Figure 3D:
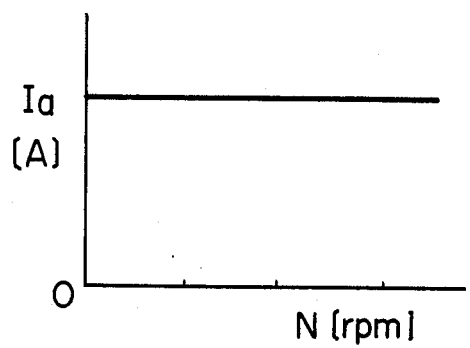
Figure 3E:
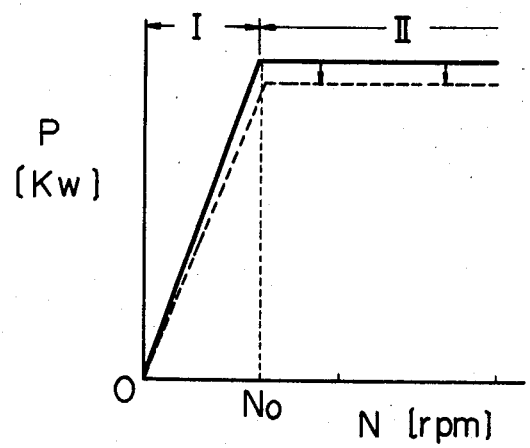

FIGS. 3A through 3E are graphs for explaining the operation of the system of FIG. 1. In the steady state, wherein the signals S1, S2 and S3 (FIG. 2) are balanced, the voltage Ea and the current $I_f$ are controlled in such a manner that the exhibit curves as illustrated in FIG. 3A (line X1) and FIG. 3B (line Y1), respectively. In the constant-torque range I, in which the speed of the DC motor 1 is relatively low, the current $I_f$ remains at one level $I_o$, for example, 6.8 A, while the level of the voltage $E_a$ is changed according to the speed N of the DC motor 1. In the constant-power range II, in which the speed of the DC motor 1 is relatively high, the level of the voltage $E_a$ remains at one level $E_o$, for example, 220 V, while the level of the current $I_f$ is changed according to the speed N. When the voltage $V_{ac}$ becomes lower than the predetermined value $V_o$, for example, 200 V, the voltages of the signals S1, S2 and S3 also become low. Therefore, the current $I_f$ are decreased as illustrated in FIG. 3A (broken line X2) and accordingly, the voltage $E_a$ is also decreased as illustrated in FIG. 3B (broken line Y2). In other words, the voltage $E_a$ of the armature 1' is decreased when the voltage $V_{ac}$ becomes lower than the predetermined value $V_o$, as illustrated in FIG. 3C. On the other hand, the current $I_a$ flowing the armature 1' of the DC motor 1 remains at one level, which is dependent upon a load condition of the DC motor 1, as illustrated in FIG. 3D in spite of the speed N. Therefore, the output power P of the DC motor 1 is changed in accordance with the change of the voltage $E_a$ of the armature 1', as illustrated in FIG. 3E.

As explained hereinbefore, the system for driving a DC motor according to the invention has the advantage that commutation between the thyristors will not fail even when the three-phase alternating voltage applied to the anti-parallel bridge circuit is decreased in the case where the speed of the DC motor is decreased.

What is claimed is:

1. A system for driving a DC motor having an armature and a field winding and driven by using a three-phase anti-parallel thyristor bridge circuit having a three-phase alternating voltage applied thereto, said system comprising:

a first means for controlling an armature current $I_a$ flowing through said armature of said DC motor; and a second means for controlling a field current $I_f$ flowing through said field winding, said second controlling means including a first detecting circuit for detecting said armature voltage $E_a$, a second detecting circuit for detecting said field current $I_f$, a field setting circuit for setting the maximum level of said field current in response to said three-phase alternating voltage, said maximum level being constant when said three-phase alternating voltage is higher than a predetermined value and said field current being proportional to said three-phase alternating voltage when said three-phase alternating voltage is lower than said predetermined value, a field control circuit for integrating the sum of the output signals generated by said first and second detecting circuits and an output signal generated from said field setting circuit and field controller means for controlling said field current in response to the integrated signal such that, when said three-phase alternating voltage decreases to a value lower than said predetermined value, said field current $I_f$ is decreased so that said armature voltage $E_a$ is decreased, and when said three-phase alternating voltage is higher than said predetermined value, said field current $I_f$ is held constant wherein said armature voltage $E_a$ is constant.

2. A system as set forth in claim 1, wherein said field setting circuit includes a transformer for receiving said three-phase alternating voltage, a rectifier for rectifying the output of said transformer, a voltage divider for dividing the output of said rectifier and a diode arranged between said voltage divider and the output point of said field setting circuit, said diode not being conductive when said three-phase alternating voltage is equal to or higher than said predetermined value, while said diode being conductive when said three-phase alternating voltage is lower than said predetermined value.

3. A system as set forth in claim 1, wherein said first detecting circuit includes a rectifier for rectifying said armature voltage $E_a$, a smoothing circuit for smoothing the output of said rectifier, a differential amplifier for amplifying the output of said smoothing circuit and an amplifier for amplifying the output of said differential amplifier, the output of said amplifier serving as the output of said first detecting circuit.

4. A system as set forth in claim 1, wherein said second detecting circuit includes a smoothing circuit for smoothing said field current $I_f$ and an amplifier for amplifying the output of said smoothing circuit, the output of said amplifier serving as the output of said second detecting circuit.

* * * * *